United States Patent
Cvengros et al.

(10) Patent No.: US 7,687,003 B2
(45) Date of Patent: Mar. 30, 2010

(54) METHOD OF FORMING PLASTIC PART HAVING HIDDEN THIN WALLED SECTION

(75) Inventors: Donald James Cvengros, Canton, MI (US); Jack Virgil Giles, Temperance, MI (US); Michael S. Pavlowski, Onsted, MI (US)

(73) Assignee: Visteon Global Technologies, Inc., Van Burn Township, MI (US)

( * ) Notice: Subject to any disclaimer, the term of this patent is extended or adjusted under 35 U.S.C. 154(b) by 1083 days.

(21) Appl. No.: 11/007,418

(22) Filed: Dec. 8, 2004

(65) Prior Publication Data

US 2006/0118981 A1    Jun. 8, 2006

(51) Int. Cl.
*B29C 45/00* (2006.01)
*B29C 45/33* (2006.01)
*B29C 45/56* (2006.01)

(52) U.S. Cl. .................. 264/328.1; 264/40.1; 264/328.7

(58) Field of Classification Search .............. 264/328.7, 264/328.1, 328.16, 40.1
See application file for complete search history.

(56) References Cited

U.S. PATENT DOCUMENTS

| | | | |
|---|---|---|---|
| 3,807,914 A | 4/1974 | Paulson et al. | |
| 4,820,149 A | 4/1989 | Hatakeyama et al. | |
| 4,917,840 A * | 4/1990 | Harada et al. | 264/40.5 |
| 4,980,115 A | 12/1990 | Hatakeyama et al. | |
| 5,149,479 A | 9/1992 | Nakajima | |
| 5,174,933 A * | 12/1992 | Toh et al. | 264/40.5 |
| 5,180,187 A | 1/1993 | Muller et al. | |
| 5,292,150 A * | 3/1994 | Watanabe et al. | 280/728.3 |
| 5,316,822 A | 5/1994 | Nishijima et al. | |
| 5,335,935 A | 8/1994 | Proos et al. | |
| 5,447,328 A | 9/1995 | Iannazzi et al. | |
| 5,476,629 A * | 12/1995 | Yabe et al. | 264/328.7 |
| 5,501,890 A | 3/1996 | Mills | |
| 5,776,522 A | 7/1998 | Budnick | |

(Continued)

FOREIGN PATENT DOCUMENTS

JP    55-103938    *    8/1980

(Continued)

OTHER PUBLICATIONS

International Search Report and Written Opinion from foreign patenting authority in copending foreign application.

*Primary Examiner*—Jill L Heitbrink
(74) *Attorney, Agent, or Firm*—Brinks Hofer Gilson & Lione

(57) ABSTRACT

An method of forming a thin walled section in an injection molded plastic part includes providing a mold having a first mold half, a second mold half, and a slide, wherein the first and second mold halves, and the slide define a mold cavity when assembled. The slide includes portions that define a thin walled section of the plastic part and is movable between a retracted position wherein the slide is partially retracted from the mold cavity and an engaged position wherein the slide is in position to define the final shape of the plastic part; injecting molten plastic into the mold cavity with the slide in the retracted position; moving the slide to the engaged position; allowing the molten plastic to cool; opening the mold halves and removing the plastic part.

16 Claims, 3 Drawing Sheets

U.S. PATENT DOCUMENTS

| | | | |
|---|---|---|---|
| 5,839,752 | A | 11/1998 | Yamasaki et al. |
| 5,913,534 | A | 6/1999 | Klingauf |
| 5,979,931 | A | 11/1999 | Totani et al. |
| 6,001,295 | A | 12/1999 | Yamamoto |
| 6,015,514 | A * | 1/2000 | Koseko ............... 264/40.1 |
| 6,042,140 | A | 3/2000 | Blazaitis et al. |
| 6,050,594 | A | 4/2000 | Budnick |
| 6,116,891 | A * | 9/2000 | Starkey ............... 425/556 |
| 6,247,722 | B1 | 6/2001 | Brodi, Jr. et al. |
| 6,296,802 | B1 | 10/2001 | Blazaitis et al. |
| RE37,540 | E | 2/2002 | Iannazzi et al. |
| 6,348,172 | B1 | 2/2002 | Barnes |
| 6,612,607 | B1 | 9/2003 | Takahashi |
| 6,733,713 | B2 | 5/2004 | Takahashi |
| 6,811,735 | B2 * | 11/2004 | Ueno et al. ............... 264/293 |
| 2003/0127773 | A1 | 7/2003 | Feistel et al. |

FOREIGN PATENT DOCUMENTS

| | | | |
|---|---|---|---|
| JP | 57-87932 | * | 6/1982 |
| JP | 61-125825 | * | 6/1986 |
| JP | 61-127323 | | 6/1986 |
| JP | 63-15719 | * | 1/1988 |
| JP | 63-302013 | | 12/1988 |
| JP | 5-293844 | | 11/1993 |
| JP | 6-234142 | | 8/1994 |
| WO | 02/14049 | * | 2/2002 |
| WO | WO 2004/024416 | | 3/2004 |

* cited by examiner

METHOD OF FORMING PLASTIC PART HAVING HIDDEN THIN WALLED SECTION

TECHNICAL FIELD OF THE INVENTION

This invention relates to a method of forming a plastic component that has a thin walled section formed therein.

BACKGROUND OF THE INVENTION

When a thin walled cross section is required in a plastic part, particularly when the part is formed by injection molding, the thinning of the section usually requires a secondary operation. This may include removal of some of the plastic with a laser, a blade, or a router. The reason for the secondary operation is that when a form or slide is placed inside an injection-molding tool to form the thin walled section, the reduced area creates a spike in pressure and the flow front is disrupted. This means that the molten plastic will not fill in near the thin wall section. Also, an increase in pressure typically results in a higher localized gloss change to the surface, while the change in the flow front results in a turbulent flow causing surface deflects. In the past, these issues have been hidden with paint or other covering.

Another common surface defect in injection molded plastic parts is sink of the material. When there is a large differential change between the nominal wall stock and the thinned cross section, the part cools at different rates. This cooling difference results in a visible depression in the final part surface.

Therefore, there is a need for a method of forming a thin walled section in an injection molded plastic part that avoids these issues.

SUMMARY OF THE INVENTION

In accordance with a preferred embodiment of the present invention, a method of forming a thin walled section in an injection molded plastic part includes the steps of providing a mold having a slide, the mold and the slide defining a mold cavity. The slide includes portions that define a thin walled section of the plastic part and is movable between a retracted position and an engaged position.

In one aspect, molten plastic resin is injected into the mold cavity with the slide in the retracted position. The slide is then moved to the engaged position, thereby forming the thin walled section. The molten plastic resin is then allowed to cool and the plastic part is removed from the mold.

In another aspect, the pressure is measured within the mold cavity and the slide is moved to the engaged position only after the pressure within the mold cavity reaches a pre-determined level.

In still another aspect, the slide is heated to a pre-determined temperature in the range of 23 degrees Celsius to 240 degrees Celsius prior to moving the slide to the engaged position.

These and other aspects and advantages of the present invention will become apparent upon reading the following detailed description of the invention in combination with the accompanying drawings.

DETAILED DESCRIPTION

Figure 1:
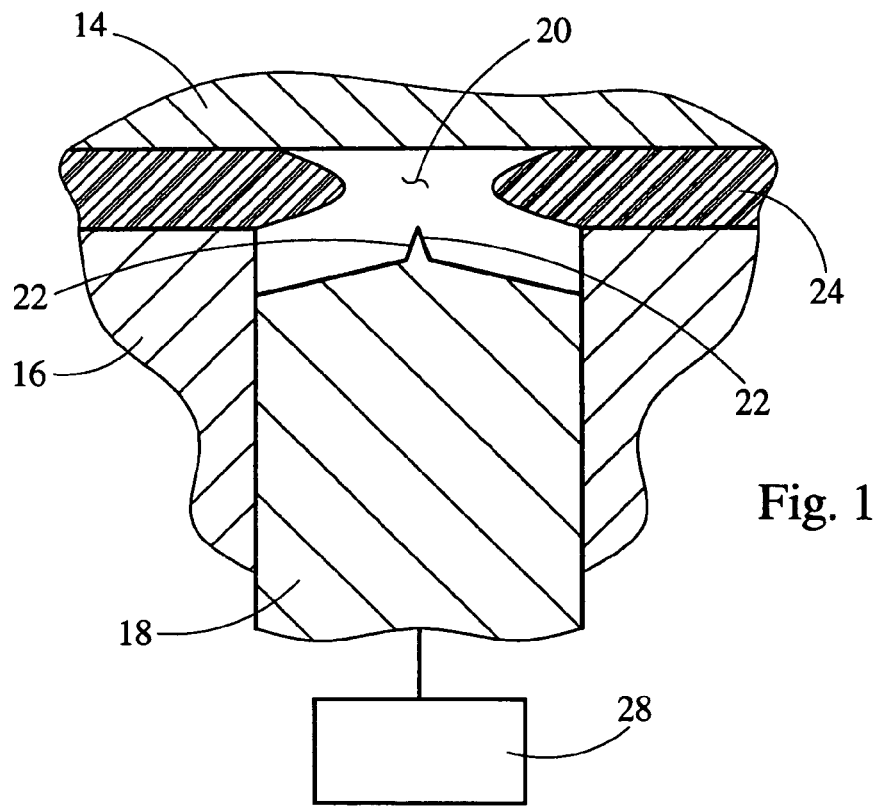
FIG. 1 is a sectional view of a portion of the mold cavity including a slide wherein the slide is shown in the retracted position.

A mold for forming a plastic part 10 having a thin walled section 12 formed therein includes a first mold half 14, a second mold half 16, and a slide 18. Referring to FIG. 1, the first mold half 14, the second mold half 16, and the slide 18 define a mold cavity 20 when assembled. The slide 18 includes portions 22 that define a thin walled section 12 of the plastic part. Preferably, the slide 18 includes a contoured shape that is a double angled step. The double angled step shape provides a gradual transition to the thin walled section 12 that reduces the formation of sinks in the final part 10.

Figure 3:
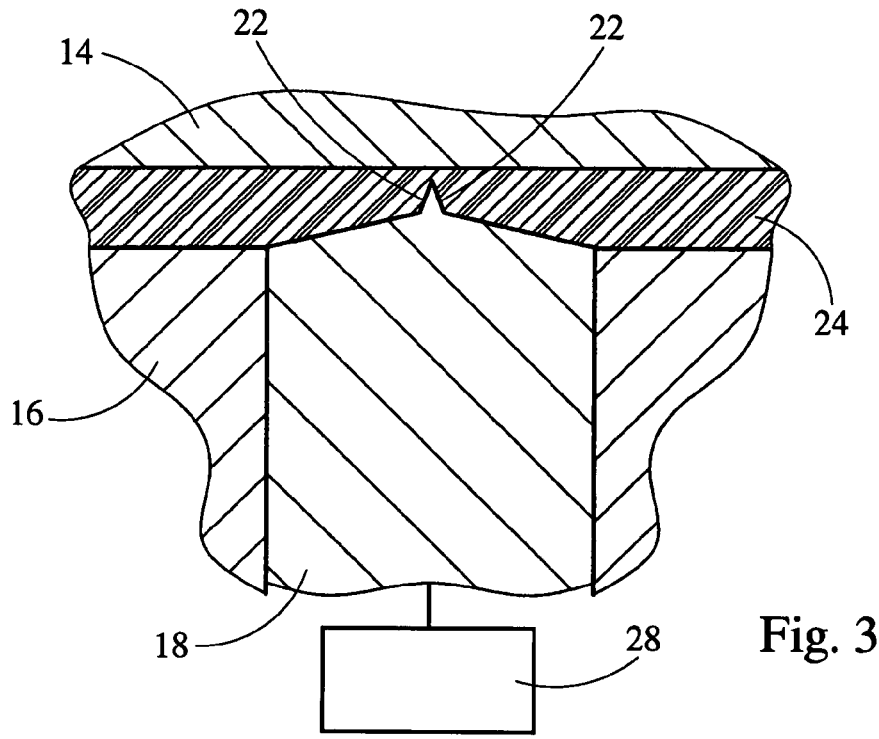
FIG. 3 is a sectional view similar to FIG. 2 wherein the molten plastic resin has substantially filled the mold cavity and the slide is moved to the engaged position.
Figure 4:
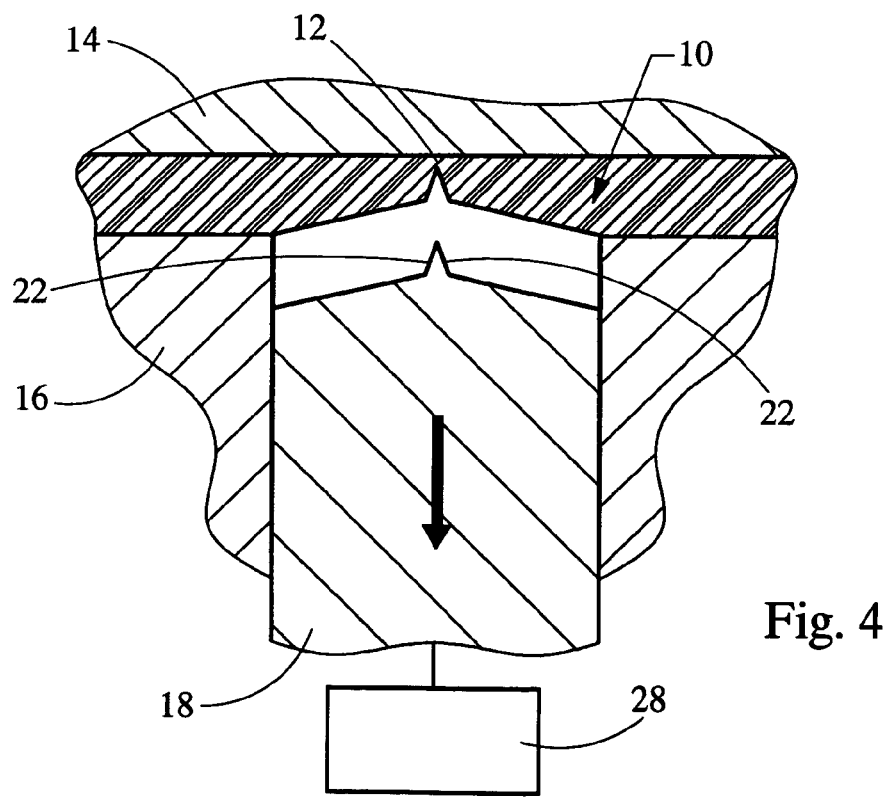
FIG. 4 is a sectional view similar to FIG. 2 wherein the slide has been retracted.
Figure 5:
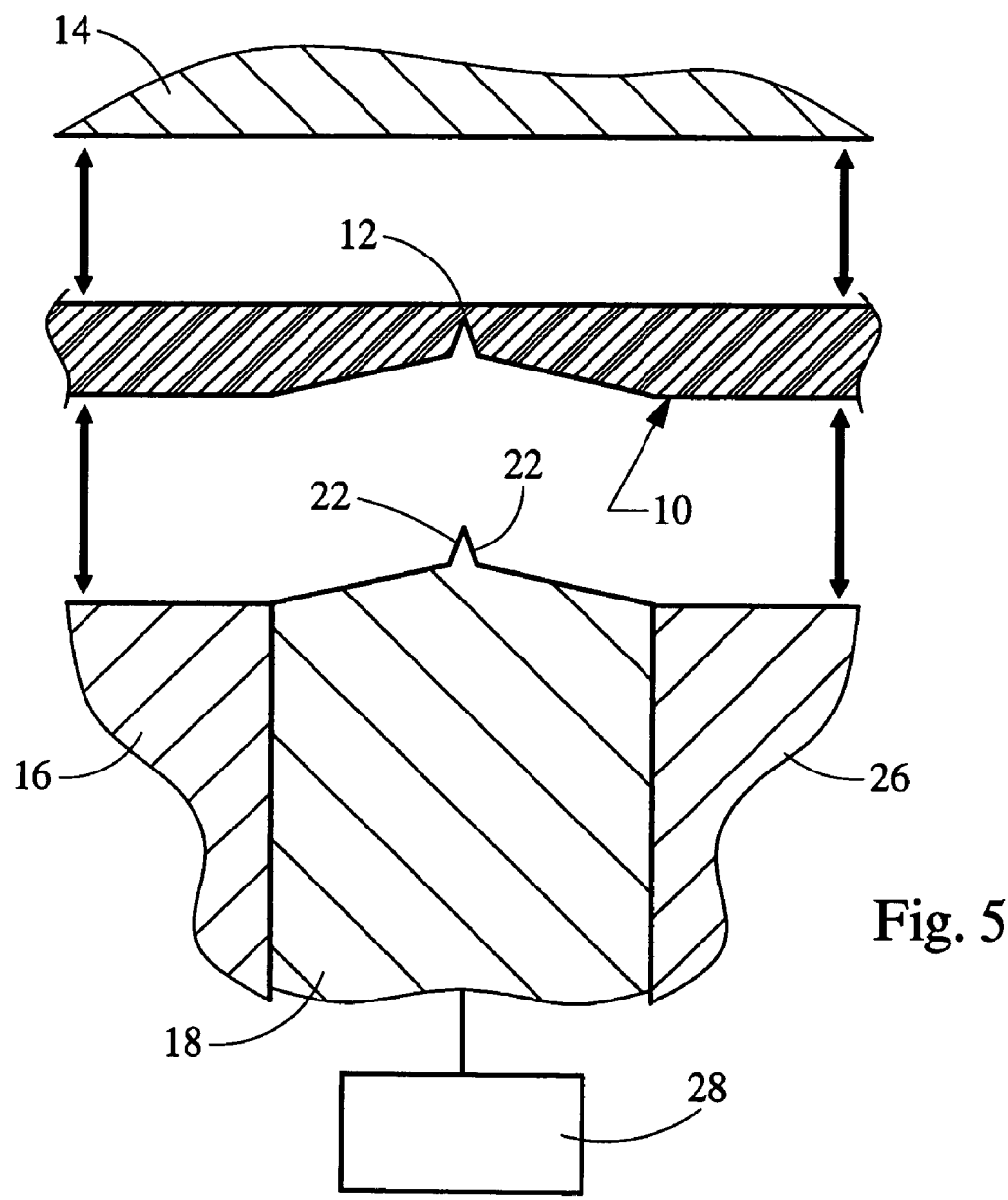
FIG. 5 is a sectional view similar to FIG. 3 wherein the plastic part is allowed to cool and the mold halves are opened to allow the plastic part to be removed.

The slide 18 is movable between a retracted position, shown in FIG. 1, wherein the portions 22 of the slide 18 that define the thin walled section 12 are partially retracted from the mold cavity 20 and an engaged position, shown in FIG. 3, wherein the portions 22 of the slide 18 that define the thin walled section 12 are in position to define the final shape of the plastic part 10.

The part 10 is formed by injecting molten plastic resin 24 within the mold cavity 20. The molten plastic resin 24 is injected with the slide 18 in the retracted position. This allows the molten plastic resin 24 to fill in the areas near where the thin walled section 12 is to be formed.

Figure 2:
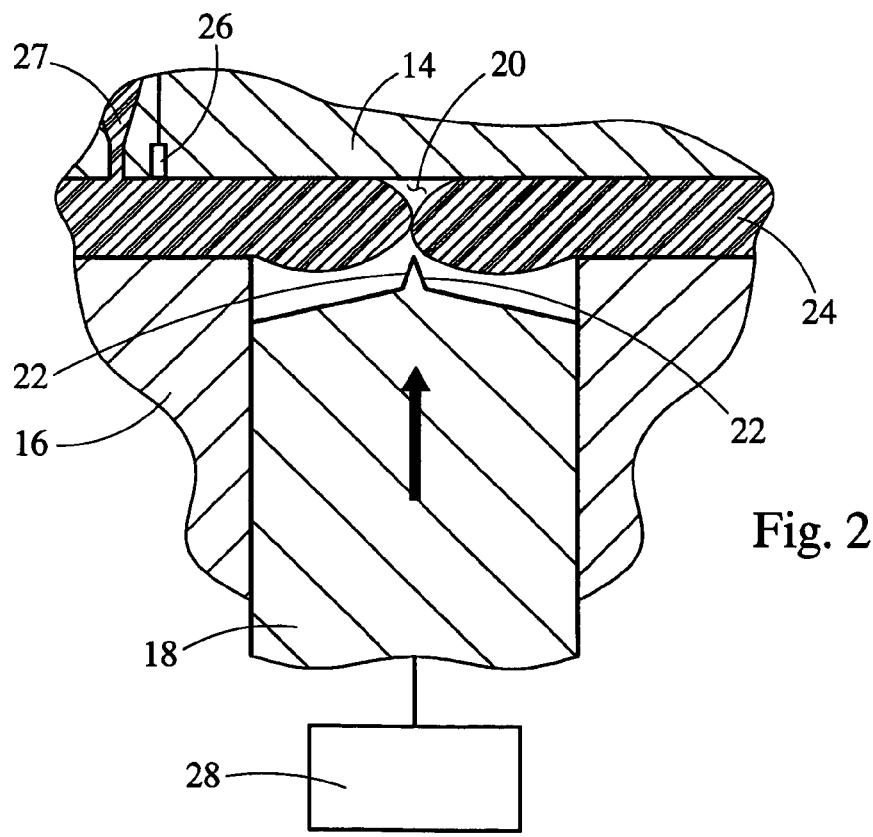
FIG. 2 is a sectional view similar to FIG. 1 wherein the molten plastic resin is beginning to fill the mold cavity.

The pressure within the mold cavity 20 is measured by a pressure transducer 26 mounted within the mold cavity 20. Preferably the pressure transducer 26 is mounted near the gates 27 (as seen in FIG. 2) introducing the resin 24 into the mold cavity. As the resin 26 flows through the mold cavity 20, the pressure increases. The maximum pressure occurs at complete fill. The build up, or ramping, of the pressure provides an indicator to determine the position of the flow front of the resin 26

The slide 18 is moved into the engaged position only after the pressure within the mold cavity 20 reaches a pre-determined level. The level of pressure will depend on the mold shape and the characteristics of the plastic resin 24. Again, by waiting until the pressure reaches a pre-determined level, the slide 18 is only moved to the engaged position when the molten plastic resin 24 has substantially filled the mold cavity 20, particularly in the vicinity where the thin walled section 12 is to be formed.

Preferably, the slide 18 is heated to temperature in the range of 23° Celsius to 240° Celsius prior to moving the slide 18 to the engaged position. This insures proper cooling of the plastic part 10. If the slide 18 is cool when moved to the engaged position, the molten plastic resin 24 that comes into contact with the slide 18 will immediately cool and harden. This will cause the formation of sinks and interferes with the flow of the molten plastic resin 24 to the remaining areas of the mold cavity 20. When the heated slide 18 comes into contact with the molten plastic resin 24 the molten plastic resin 24 will remain molten, thereby allowing the molten plastic resin 24 to continue flowing within the mold cavity 20. This insures that the mold cavity 20 is completely filled prior to the molten plastic resin 24 beginning to cool and harden.

After the mold cavity 20 is completely filled, the molten plastic resin 24 is allowed to cool and harden. The heated slide 18 may be retracted during the cooling of the part 10. This reduces the added heat that is being transferred from the heated slide 18. This gap or space also provides an insulating gap between the heated slide 18 and the thin wall section 12 of the part 10. The slide 18 retraction also helps with ejection of the part 10, by preventing the part 10 from sticking to the heated slide and reducing the stress on the part 10. The mold halves 14, 16 are then opened, and the plastic part 10 can be removed from the mold. The mold halves 14, 16 can be opened before the plastic resin 24 is completely cool, so long as the plastic resin 24 is allowed to cool to a substantially solid state.

In order to actuate the slide 18, the slide 18 is coupled to an actuator 28. The actuator 28 may be any of a variety of actuators used in the industry, such as pneumatic, hydraulic or mechanical. Preferably the actuator 28 can vary the rate at which the slide 18 is moved.

As a person skilled in the art will recognize from the previous description and from the figures and claims, modifications and changes can be made to these embodiments of the invention without departing from the scope of the invention as defined in the following claims.

What is claimed is:

1. A method of forming a thin walled section in an injection molded plastic part comprising:
   providing a mold having a first mold half, a second mold half, and a slide, wherein the first mold half, the second mold half, and the slide define a mold cavity when assembled and the slide includes a double angled step that defines a thin walled section of the plastic part, the slide being movable between a retracted position wherein the double angled step that defines the thin walled section partially retracted from the mold cavity and an engaged position wherein the double angled step that defines the thin walled section is in position to define the final shape of the plastic part;
   injecting molten plastic into the mold cavity with the slide in the retracted position;
   moving the slide to the engaged position such that the double angled step forms a gradual transition to a thinnest part of the thin walled section;
   allowing the molten plastic to cool;
   opening the mold halves and removing the plastic part; and
   wherein each half of the double angled step is comprised of a first surface that defines a first angle with respect to the slide movement direction and a second surface that defines a second angle with respect to the slide movement direction, the second angle being greater than the first angle but less than ninety degrees, one end of each of the first surfaces defining the thinnest part of the thin walled section, an opposite end of each of the first surfaces being adjacent to one of the second surfaces.

2. The method of claim 1 further including measuring the pressure within the mold cavity prior to moving the slide to the engaged position and moving the slide to the engaged position only after the pressure within the mold cavity reaches a pre-determined level.

3. The method of claim 2 further including providing a pressure transducer and mounting the pressure transducer so as to be in communication with the molten plastic.

4. The method of claim 3 further including mounting the pressure transducer in close proximity to a gate introducing the molten plastic into the mold cavity.

5. The method of claim 2 further including heating the slide to a pre-determined temperature prior to moving the slide to the engaged position.

6. The method of claim 5 further including heating the slide to a temperature in the range of 23° Celsius to 240° Celsius.

7. The method of claim 1 wherein each of the second surfaces defines a gradual transition to the thinnest part of the thin walled section and which prevents formation of sinks in the surface of the plastic part.

8. The method of claim 1 wherein moving of the slide is done at a rate that is variable.

9. The method of claim 1 further comprising the step of retracting the slide prior to the step of opening the mold halves.

10. The method of claim 9 wherein the retracting step is performed during the step of allowing the molten plastic to cool.

11. A method of forming a thin walled section in an injection molded plastic part comprising:
    providing a mold having a first mold half, a second mold half, and a slide, wherein the first mold half, the second mold half, and the slide define a mold cavity when assembled and the slide includes a double angled step that defines a thin walled section of the plastic part, the slide being movable between a retracted position, wherein the double angled step that defines the thin walled section is partially retracted from the mold cavity and an engaged position wherein the double angled step that defines the thin walled section is in position to define the final shape of the plastic part;
    injecting molten plastic into the mold cavity with the slide in the retracted position;
    measuring the pressure within the mold cavity with a pressure transducer mounted so as to be in communication with the molten plastic;
    heating the slide to a pre-determined temperature in the range of 23° Celsius to 240° Celsius;
    moving the slide to the engaged position after the pressure within the mold cavity reaches a pre-determined level such that the double angled step forms a gradual transition to the thin walled section;
    allowing the molten plastic to cool;
    opening the mold halves and removing the plastic part; and
    wherein each half of the double angled step is comprised of a first surface that defines a first angle with respect to the slide movement direction that is less than ninety degrees and a second surface that defines a second angle with respect to the slide movement direction that is greater than the first angle but less than ninety degrees, wherein one end of each of the first surfaces defines a thinnest part of the thin walled section and an opposite end of each of the first surfaces being adjacent to one of the second surfaces.

12. The method of claim 11 further including mounting the pressure transducer in close proximity to a gate introducing the molten plastic into the mold cavity.

13. The method of claim 11 wherein the gradual transition to the thin walled section prevents formation of sinks in the surface of the plastic part.

14. The method of claim 11 wherein moving of the slide is done at a rate that is variable.

15. The method of claim 11 further comprising the step of retracting the slide prior to the step of opening the mold halves.

16. The method of claim 15 wherein the retracting step is performed during the step of allowing the molten plastic to cool.

* * * * *